Patented Dec. 3, 1929

1,737,906

UNITED STATES PATENT OFFICE

HARRY F. ADAMS, OF GREENPORT, NEW YORK

COMPOSITION OF AND METHOD OF PRODUCING CONCRETE

No Drawing.    Application filed August 7, 1923. Serial No. 656,261.

This invention relates to a composition of concrete.

In structures of concrete, either in monolith or block construction, it often becomes necessary to bore holes for the securing thereto of other portions of the structure. With the usual compositions, this process is very destructive of the boring tools.

It is also often desirable to drive nails into the concrete with the ordinary compositions, this cannot be done without danger of breaking or cracking.

Due to the high cost of labor and the desire to increase construction in a given amount of time, it is very desirable to use a concrete which will set quickly. This is advantageous in monolith construction to prevent compression ruptures due to too rapid advance of the work. This use of a quick setting concrete is advantageous also in the manufacture of building blocks, in order to be able to remove the blocks from their moulds shortly after they are moulded without danger of breakage and also to make unnecessary the keeping of a large stock of blocks on hand.

An object of my invention is the provision of an improved concrete composition.

Another object of my invention is the provision of a concrete composition which will be cheap of manufacture, light in weight, simple to mix, and which will set quickly.

Another and further object of my invention is the provision of a concrete composition which can be easily sawed or drilled with a minimum damage to the saw or drill, and yet will have great toughness.

Another and still further object of my invention is the provision of an improved light body for concrete consisting of properly treated crushed or ground shells.

Another and still further object of my invention is the provision of a concrete composition in which nails can be driven without danger of breaking or cracking.

My invention is particularly well adapted for use in concrete blocks.

In carrying out my invention, I have found that the following ingredients furnish a concrete which very admirably carries out the objects of my invention:—

1 bag of cement (100 pounds).
3 bags of ground oyster shells.
1 pound of caustic or sal soda.

When a hard surface is desired, I add one bag of sand to the above formula and the resultant mixture used so that it will be at the surface only, the main body being preferably without sand.

As a good formula by which workmen may use my invention when sand is used I suggest the following:—

Cement, 2 parts by volume.
Ground oyster shells, treated, 3 parts by volume.
Sand, 1 part by volume.
Caustic soda, small amount.

In preparing the ground shells for use, I have found it desirable to soak them in fresh water from 12 to 24 hours, after which they are dried. The fresh water used in preparing the shells, probably removes some soluble salt or salts although I am not sure of the actual action. The shells and cement are mixed dry, after which the water and soda are added until the desired consistency is obtained. In case the sand is used, it also is mixed with the other dry ingredients before the water is added. After the addition of the water, the mass is poured into the desired forms.

In carrying out my invention, I have found that water having a low mineral content, such as rain water produces very good results.

The soda causes the concrete to set more quickly than the ordinary compositions, thus making it possible to progress the work faster without danger of too great weight causing rupture in the larger moulds. In the case of the manufacture of building blocks, this quick setting quality, permits the blocks to be removed from the moulds sooner than would be otherwise possible.

In putting my invention into actual practice, I am able to color the concrete any color, the dry pigments being mixed with the dry cement.

I have found by actual experience that the concrete made by this composition is easily drilled and sawed without damage to the drill or saw. I have also found that it is very tough and consequently much less liable to chip and break.

I have also found that this composition makes a concrete which is highly water resistant. This is probably due to the close grain, produced by the crushed shell.

While I have described one formula for my invention, I desire to have it understood that I do not limit myself to the exact proportions set forth and that substitutions of materials having the same characteristics may be made without departing from the spirit of my invention and within the scope of the appended claims.

Having described my invention, what I claim is:—

1. A process for forming concrete comprising first, the crushing of oyster shells, then soaking them in fresh water after which the crushed shells are mixed with suitable cement and water to form a concrete composition.

2. A process for forming concrete comprising first, the crushing of oyster shells, then soaking them in fresh water, then drying them and then mixing them with suitable cement and water to form a concrete composition.

3. A process for forming concrete comprising first, the crushing of oyster shells, then soaking them in fresh water after which the crushed shells are mixed with cement, water and a suitable filler.

4. The process of preparing an ingredient for concrete which consists in first crushing oyster shells, then soaking them in fresh water and then draining the water from the shells.

5. A concrete composition comprising cement and oyster shells which have been crushed and then soaked in fresh water.

In testimony whereof I hereunto affix my signature.

HARRY F. ADAMS.